No. 752,157. PATENTED FEB. 16, 1904.
G. HACKER.
STOCK WATERING APPARATUS.
APPLICATION FILED SEPT. 25, 1903.
NO MODEL.
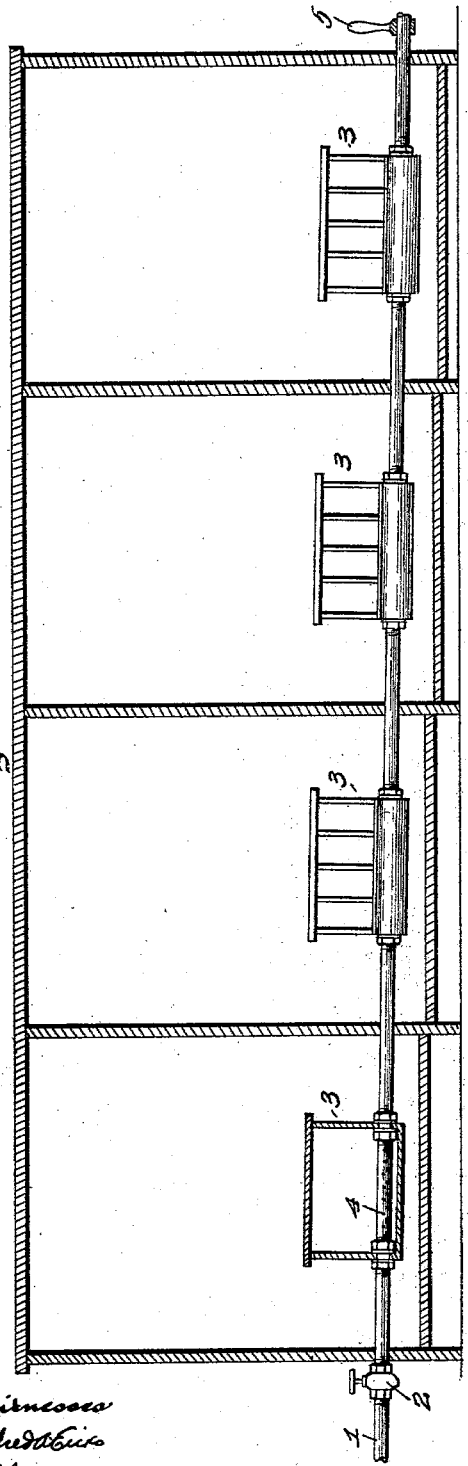
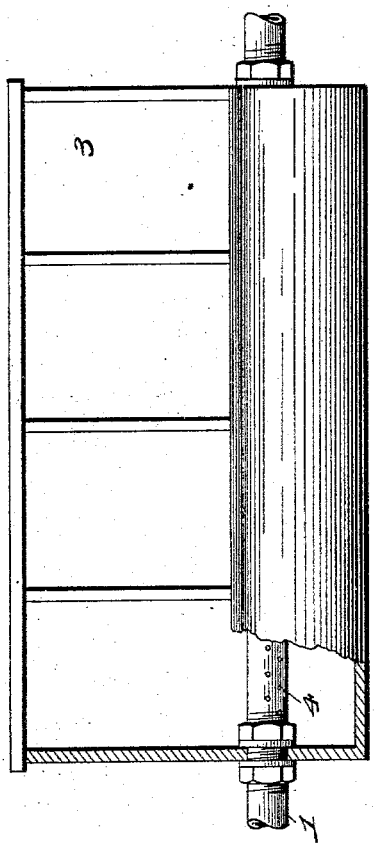
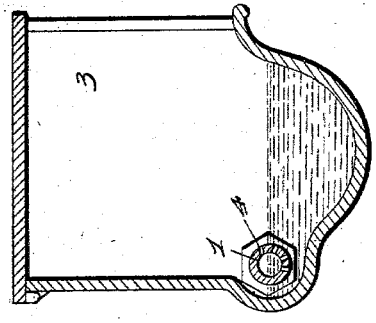

No. 752,157. Patented February 16, 1904.

UNITED STATES PATENT OFFICE.

GEORGE HACKER, OF ST. LOUIS, MISSOURI.

STOCK-WATERING APPARATUS.

SPECIFICATION forming part of Letters Patent No. 752,157, dated February 16, 1904.

Application filed September 25, 1903. Serial No. 174,613. (No model.)

*To all whom it may concern:*

Be it known that I, GEORGE HACKER, a citizen of the United States, residing at St. Louis, State of Missouri, have invented certain new and useful Improvements in Stock-Watering Apparatus, of which the following is a specification containing a full, clear, and exact description, reference being had to the accompanying drawings, forming a part hereof.

My invention relates to improvements in stock-watering apparatus, and has for its object to provide means for supplying a series of drinking-fountains supplied with water from a common source, the water-supply being conveyed to all of the fountains by a single pipe, the fountains being mounted on the pipe and the fountains being revoluble for cleansing by means of the pipe.

Other objects are disclosed by the following description.

In the drawings, Figure 1 is a front view of an apparatus embodying my invention in place in a poultry-house, the walls of the house being shown in section. Fig. 2 is a transverse vertical view in mid-section of one of the fountains used in my apparatus. Fig. 3 is a front view of one of the fountains, the end being broken away to show the manner in which the fountain is mounted on the pipe.

Referring to the drawings, the pipe 1 is flexibly connected to any suitable source of water-supply at its upper end, and the valve 2 is seated in the pipe 1 to control the flow of water to the fountains 3. The fountains 3 are inclined downwardly from the source of water-supply, as shown in Fig. 1, and have bottoms formed as shown in section in Fig. 2, the pipe 1 being inserted at the rear of the fountains 3 and at or near the water-line of the fountains when filled, as shown by the broken lines in Fig. 2. The fountains may be made of light sheet metal or cast of metal, as desired, as the pipe 1 affords a rigid and adequate support for fountains of either material. The pipe 1 is provided with perforations 4 within the fountains, the water being supplied through such perforations. When it is desired to cleanse the fountains, the pipe 1 is turned by means of the lever 5 to tilt the fountains 3 backward. The valve 2 having been previously closed to shut off the water-supply, the water in the fountains is discharged through the perforations 4. The pipe 1 consequently acts both as a supply-pipe and a discharge-pipe.

Having fully described my invention, what I claim as new, and desire to have secured to me by the grant of Letters Patent, is—

A stock-watering apparatus consisting of a supply-pipe inclined downward from the source of supply, a series of drinking-fountains rigidly mounted on the pipe, the pipe being perforated within the fountains, and means whereby the pipe may be revolved to empty the contents of the fountains through the perforations in the pipe, substantially as described.

In testimony whereof I have signed my name to this specification in the presence of two subscribing witnesses.

GEORGE HACKER.

Witnesses:
ALFRED A. EICKS,
M. G. IRION.